(12) United States Patent
Xiao et al.

(10) Patent No.: US 11,212,735 B2
(45) Date of Patent: Dec. 28, 2021

(54) BASE STATION, USER EQUIPMENT, AND RELATED METHOD

(71) Applicants: SHARP KABUSHIKI KAISHA, Sakai (JP); FG Innovation Company Limited, Tuen Mun (CN)

(72) Inventors: Fangying Xiao, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 332 days.

(21) Appl. No.: 16/319,459

(22) PCT Filed: Jul. 21, 2017

(86) PCT No.: PCT/CN2017/093797
§ 371 (c)(1),
(2) Date: Jan. 21, 2019

(87) PCT Pub. No.: WO2018/014861
PCT Pub. Date: Jan. 25, 2018

(65) Prior Publication Data
US 2021/0105704 A1 Apr. 8, 2021

(30) Foreign Application Priority Data

Jul. 22, 2016 (CN) .......................... 201610585882.1

(51) Int. Cl.
| | | |
|---|---|---|
| H04W 48/12 | (2009.01) | |
| H04W 48/10 | (2009.01) | |
| H04W 48/14 | (2009.01) | |
| H04W 68/00 | (2009.01) | |

(52) U.S. Cl.
CPC ........... *H04W 48/12* (2013.01); *H04W 48/10* (2013.01); *H04W 48/14* (2013.01); *H04W 68/005* (2013.01)

(58) Field of Classification Search
CPC ..... H04W 48/12; H04W 48/14; H04W 48/10; H04W 68/005; H04W 36/08
See application file for complete search history.

(56) References Cited

U.S. PATENT DOCUMENTS

| | | |
|---|---|---|
| 2007/0287440 A1 | 12/2007 | Benkert et al. |
| 2010/0167746 A1 | 7/2010 | Lee et al. |

(Continued)

FOREIGN PATENT DOCUMENTS

| | | |
|---|---|---|
| CN | 101873694 A | 10/2010 |
| CN | 104871446 A | 8/2015 |

(Continued)

OTHER PUBLICATIONS

NTT DOCOMO, "New SID Proposal: Study on New Radio Access Technology", RP-160671, 3GPP TSG RAN Meeting #71, Goteborg, Sweden, Mar. 7-10, 2016.

(Continued)

*Primary Examiner* — Vinncelas Louis
(74) *Attorney, Agent, or Firm* — ScienBiziP, P.C.

(57) ABSTRACT

A method performed by a user equipment and a user equipment are provided. The method includes receiving a change indication for a system information block (SIB) from system information which is broadcast periodically; if the change indication is different from a stored value of the SIB, considering the SIB as invalid; if the SIB is stored and invalid and is indicated as not broadcast, acquiring the SIB by sending a system information acquisition request; and if the SIB is stored and invalid and is broadcast, acquiring the SIB from a corresponding system information window (SI-window).

2 Claims, 6 Drawing Sheets

300

SEND TO A USER EQUIPMENT A CHANGE INDICATION FOR SYSTEM INFORMATION, WHEREIN THE CHANGE INDICATION FOR SYSTEM INFORMATION IS ASSOCIATED WITH AT LEAST ONE OF PERIODICALLY BROADCAST SYSTEM INFORMATION AND NON-PERIODICALLY BROADCAST SYSTEM INFORMATION — S310

(56) References Cited

U.S. PATENT DOCUMENTS

| | | | |
|---|---|---|---|
| 2012/0052860 A1 | 3/2012 | Faronius et al. | |
| 2015/0223148 A1 | 8/2015 | Shi et al. | |
| 2019/0150071 A1* | 5/2019 | Lee | H04W 36/08 370/328 |

FOREIGN PATENT DOCUMENTS

| | | | | |
|---|---|---|---|---|
| EP | 2323426 | A1 | 5/2011 | |
| EP | 3487228 | A1 | 5/2019 | |
| RU | 2453075 | C1 | 6/2012 | |
| WO | 2013183966 | A1 | 12/2013 | |
| WO | 2016036463 | A1 | 3/2016 | |
| WO | WO-2017074042 | A1 * | 5/2017 | H04W 48/12 |
| WO | 2018/016922 | A1 | 1/2018 | |
| WO | 2018/022541 | A1 | 2/2018 | |
| WO | 2018/127133 | A1 | 7/2018 | |

OTHER PUBLICATIONS

Intel Corporation, "System information for standalone NR deployment", R2-163586, 3GPP TSG-RAN WG2 Meeting #94, Nanjing, China, May 23-27, 2016.

Samsung: "Report of email discussion on [94#40][NR] System information", R2-165201, 3GPP TSG-RAN WG2 95, Gothenburg, Sweden, Aug. 22-26, 2016.

CATT: "Indexed SI in NR", R2-1700976, 3GPP TSG-RAN WG2 #97, Athens, Greece, Feb. 13-17, 2017.

Mediatek Inc.: "Comparison of Methods for Stored System Information", R2-1701326, 3GPP TSG-RAN2 #97 Meeting, Athens, Greece, Feb. 13-17, 2017.

Huawei, Hisilicon: "System information design", R2-164127, 3GPP TSG-RAN2 Meeting #94, Nanjing, China, May 23-27, 2016.

Samsung: "System Information Signalling Design in NR", R2-163371, 3GPP TSG-RAN WG2 Meeting #94, Nanjing, China, May 23-27, 2016.

Interdigital Communications: "System Information Acquisition for New Radio Access", R2-164088, 3GPP TSG-RAN WG2 #94, Nanjing, China, May 23-27, 2016.

Sony, "System Information Enhancements for NR", R2-163977, 3GPP TSG RAN WG2 Meeting #94 Nanjing, China, May 23-27, 2016.

Samsung, "System Information Signalling in NR", R2-162215, 3GPP TSG-RAN WG2 Meeting #93bis Dubrovnik, Croatia, Apr. 11-15, 2016.

U.S. Appl. No. 62/334,706, filed May 11, 2016.

* cited by examiner

BASE STATION, USER EQUIPMENT, AND RELATED METHOD

TECHNICAL FIELD

The present disclosure relates to the field of wireless communication technology, and more particularly, to a base station, a user equipment, and a related method.

BACKGROUND

In the 3rd Generation Partnership Project (3GPP) RAN #71 meeting held in March 2016, NTT DOCOMO presented a new research project on 5G technical standards (see non-patent document: RP-160671: New SID Proposal: Study on New Radio Access Technology) and the new research project was approved. The purpose of the research project is to develop a New Radio (NR) access technology to meet all the 5G application scenarios, requirements, and deployment environment needs. NR has three application scenarios: enhanced Mobile Broadband (eMBB) Communications, massive Machine Type Communication (mMTC), and Ultra-Reliable and Low Latency Communications (URLLC). According to the planning of the research project, the standardization of NR is conducted in two phases: the 1st phase would be completed in mid-2018; and the 2nd phase would be completed by the end of 2019. The standard specifications of the 1st phase need to be compatible with that of the 2nd phase; and the standard specifications of the 2nd phase need to be established based on the standard specification of the 1st phase, and meet all the requirements of the 5G NR technical standard.

For better energy conservation and emission reduction, the initial requirement of the project is to avoid the network repeatedly sending of unnecessary information. This requirement is based on the following consideration:

In an existing LTE system, in order to ensure normal access of an LTE user equipment (UE), a base station (eNB) periodically broadcasts access stratum and non-access stratum information, which is collectively referred to as system information. In the present LTE system, the system information is divided into a Master Information Block (MIB) and several System Information Blocks (SIBs) for carrying different contents; and up to 20 SIBs are defined by LTE so far. The MIB carries the necessary and most frequently transmitted parameters for acquiring basic information of a cell. SIB1 includes parameters for determining whether a cell is suitable for cell selection and time domain scheduling information of other SIBs. The MIB and the SIB1 are sent in a predefined time period. Other SIBs with a same scheduling period are arranged in a same System Information Message (referred to as SI Message) and are periodically sent in a corresponding system information window (SI-window) according to time domain scheduling information carried in the SIB1. Other than MIB and SIB1, not all SIBs need to be broadcast. According to the features supported by a current access network device and the features of the non-access stratum, the eNB selects a system information block relevant to the features for broadcast. For example, if the current access network supports enhanced access control, the eNB broadcasts SIB14, which carries relevant information of EAB; otherwise, broadcasting is not performed. If the current access network supports a multimedia broadcast multicast service (MBMS), the eNB broadcasts SIB13 and so on. These broadcast SIBs are reflected in the scheduling information carried by the SIB1; and unscheduled SIBs are not broadcast. Prior to initiating the access, the UE further needs to acquire other SIBs based on its own features in addition to MIB and SIB1 that must be acquired; and then the access is initiated. For example, if the UE supports multiple standards, SIB8 further needs to be read to acquire inter-RAT-related cell reselection information; otherwise, SIB8 does not need to be read. If the UE supports WLAN interoperation, SIB17 further needs to be acquired; otherwise, SIB17 does not need to be acquired.

The method of periodic broadcasting of all system information supported by the eNB helps the UE to acquire the corresponding information at any time. However, this method does not consider the acquisition requirements of the UE (for example, only a small number of UEs need to acquire some of the system information); and all system information supported by the eNB is broadcast repeatedly on a specific downlink resource, resulting in low system resource utilization and large energy consumption. At the 3GPP RAN2 #94 meeting, some manufacturers proposed to transmit system information by combining network autonomous broadcasting and UE request transmission. Those manufacturers suggested to classify system information into two categories: one type of system information is sent by the eNB autonomously through periodic broadcasting (this type of system information is referred to as periodically broadcast system information in the present disclosure); and such system information may include system information that is the most important or necessary for acquiring other system information or is required by most UEs; the other type of system information is sent in certain cases (for example, when a UE request is received or when an update is required) (this type of system information is referred to as non-periodically broadcast system information in the present disclosure); the system information for non-periodic broadcasts can be sent through broadcast, multicast, or unicast.

In the existing LTE system, a change of system information only occurs in a specific system frame, which is called a system information change period. The base station indicates system information change in two ways: one of which is to send a paging message carrying change indication message for system information. When the system information needs to be changed, the base station sends a paging message during the system information change period, and sends the changed system information in the next change period. The other way is to modify the system information value identifier carried in the SIB1 when the system information is changed. The user equipment determines whether the system information is changed by determining whether the system information value identifier carried in the SIB1 and the locally stored system information value identifier are the same. In the system information transmission method based on the combination of network autonomous broadcasting and UE request transmission, how the user equipment knows that the system information is changed is a problem that has to be addressed.

SUMMARY OF INVENTION

According to a first aspect of the present disclosure, a method in a base station is provided, comprising: sending to a user equipment a change indication for system information, wherein the change indication for system information is associated with at least one of periodically broadcast system information and non-periodically broadcast system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

According to a second aspect of the present disclosure, a base station is provided, comprising a sending unit, configured to send to a user equipment a change indication for system information, wherein the change indication for system information is associated with at least one of periodically broadcast system information and non-periodically broadcast system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

According to a third aspect of the present disclosure, a method in a user equipment (UE) is provided, comprising: receiving, from a base station, a change indication for system information, wherein the change indication for system information is associated with at least one of periodically broadcast system information and non-periodically broadcast system information; and receiving, from the base station, changed system information according to the change indication for system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

In an embodiment, the receiving changed system information comprises: receiving the periodically broadcast system information at a system information window corresponding to the changed system information.

In an embodiment, the receiving changed system information comprises: sending to the base station a request for changed non-periodically broadcast system information; and receiving from the base station the changed non-periodically broadcast system information.

According to a fourth aspect of the present disclosure, a user equipment (UE) is provided, comprising: a receiving unit, configured to receive from a base station, a change indication for system information, wherein the change indication for system information is associated with at least one of periodically broadcast system information and non-periodically broadcast system information; and receive, from the base station, changed system information according to the change indication for system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

In an embodiment, a receiving unit is configured to receive the periodically broadcast system information at a system information window corresponding to the changed system information.

In an embodiment, the UE further comprises: a sending unit, configured to send to the base station a request for changed non-periodically broadcast system information, wherein the receiving unit is configured to receive, from the base station, the changed non-periodically broadcast system information.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

Figure 1:
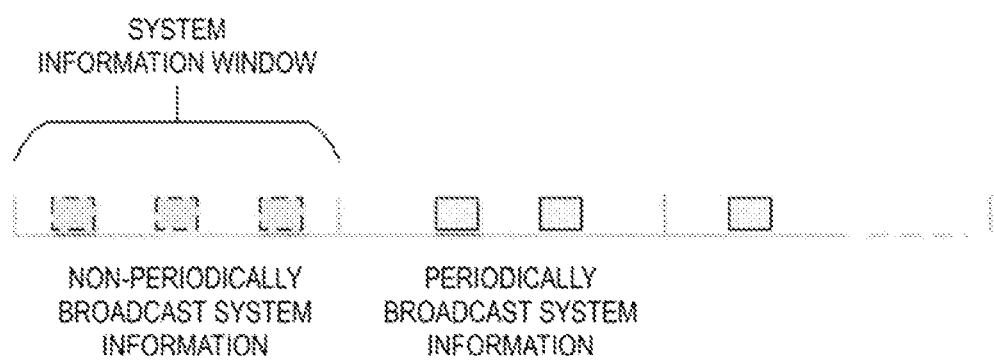
FIG. 1 is a schematic diagram of periodically broadcast system information and non-periodically broadcast system information.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

The terms used in the present disclosure are described below. Unless otherwise specified, all the terms of the present disclosure are defined herein using the definitions provided below.

System information of interest: refers to a system information group consisting of a system information block SIB or several system information blocks that the UE wishes to acquire; for example, the system information blocks are grouped according to a scheduling period, and the system information blocks in the same system information group have the same scheduling period; then the system information group represents the system information message. Hereinafter, SI message refers to a system information block group unless otherwise specified.

System Information Window: refers to a time interval for sending a system information message. The system information of interest may be sent in one or more system information windows. For periodically broadcast system information, its corresponding system information window may appear periodically. Optionally, the periodically broadcast system information carries the size of the system information window and/or a related parameter used to calculate a starting position of the system information window. For example, the periodically broadcast system information carries the size of the system information window; and the time domain is divided into continuous system information windows according to the size of the system information window. The starting positions of the corresponding system information windows are determined in a specific order for different system information blocks or system information block groups (for example, in an order in which they appear in the scheduling information included in the periodically broadcast system information), which are distributed sequentially in different system information windows for transmission.

Periodically broadcast SI message: SI messages including periodically broadcast system information are called periodically broadcast SI messages.

Non-periodically broadcast SI message: SI messages including non-periodically broadcast system information are called non-periodically broadcast SI messages.

System information change notification message: refers to a message used by a base station to notify the user equipment whether the system information is changed. An example is a paging message carrying a system information change indication.

The present disclosure introduces two possible transmission solution examples for the periodically broadcast system information and the non-periodically broadcast system information.

Transmission solution 1: the periodically broadcast system information and the non-periodically broadcast system information are sent in different system information windows (or SI messages)

FIG. 1 is a schematic diagram of the transmission solution 1. The square in dashed lines represents the non-periodically broadcast system information and the square in solid lines represents the periodically broadcast system information. The sending sequence of the periodically broadcast SI messages and the non-periodically broadcast SI messages depends on scheduling information. For example, the periodically broadcast SI messages are sent earlier than (or later than) the non-periodically broadcast SI messages; or some periodically broadcast SI messages are sent earlier than (or later than) the non-periodically broadcast SI messages.

When sending the non-periodically broadcast system information, the base station regards the non-periodically broadcast system information as a separate single message or more SI messages and sends the messages in a corresponding system information window. Preferably, the SI message does not include information related to a scheduling period (the periodically broadcast system information needs to be sent periodically, therefore the scheduling information of the SI message in which the periodically broadcast system information is located carries information related to the scheduling period of the SI message) or include information related to the scheduling period; but a scheduling period value is set to be a value different from the value of the scheduling period of the periodically broadcast SI message, such as infinite or zero. Preferably, the scheduling information of the SI message in which the non-periodically broadcast system information is located further includes indication information for indicating whether the SI message is sent. A user equipment determines, according to the indication information, whether a corresponding SI message is broadcast by the base station. Preferably, the user equipment may also determine, according to the value of the scheduling period, whether the non-periodic SI message is sent. For example, when the scheduling period value is 0, it indicates that the non-periodically broadcast SI message is sent; when the scheduling period is infinite, it indicates that non-periodically broadcast SI message is not sent.

An example format for scheduling non-periodically broadcast system information is provided below:

```
-- ASN1START
PerdiodicallyBroadcastSystemInformationBlockTypeX ::=          SEQUENCE {
     ......
     schedulingInfoList                       SchedulingInfoList,
     si-WindowLength                          ENUMERATED {
                                                   ms1, ms2, ms5, ms10, ms15, ms20,
                                                   ms40},
     systemInfoValueTag                       INTEGER (0..31),
     nonCriticalExtension                     SystemInformationBlockType1-v890-IEs   OPTIONAL
}
SchedulingInfoList ::= SEQUENCE (SIZE (1..maxSI-Message)) OF SchedulingInfo
SchedulingInfo ::= SEQUENCE {
     c1          choice {
        periodicallySiSchedulingInfo          PeriodicallySiSchedulingInfo
        nonperiodicallySiSchedulingInfo       NonPeriodicallySiSchedulingInfo   OPTIONAL
}
```

-continued

```
PeriodicallySchedulingInfo ::= SEQUENCE {
    si-Periodicity              ENUMERATED {
                                    rf8, rf16, rf32, rf64, rf128, rf256, rf512,},
    sib-MappingInfo             SIB-MappingInfo
}
NonperiodicallySchedulingInfo := SEQUENCE {
    sib-MappingInfo             SIB-MappingInfo
    broadcastIndication         BOOLEAN
}
SIB-MappingInfo ::= SEQUENCE (SIZE (0..maxSIB-1)) OF SIB-Type
SIB-Type ::=                    ENUMERATED {
                                    sibTypeY1, sibTypeY2, ........ }
-- ASN1STOP
```

Transmission solution 2: the periodically broadcast system information and the non-periodically broadcast system information are sent in a same system information windows (or a same SI message)

Figure 2:
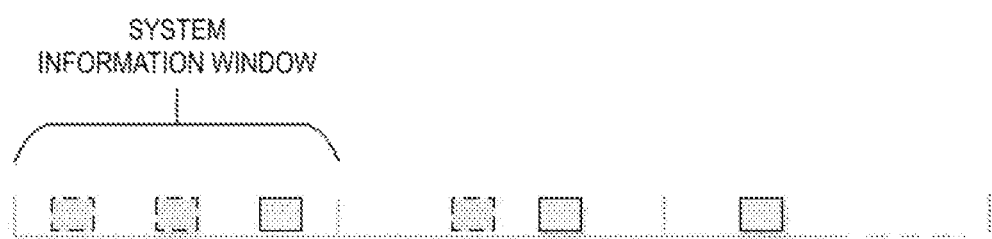
FIG. 2 is another schematic diagram of the periodically broadcast system information and the non-periodically broadcast system information.

FIG. 2 is a schematic diagram of the transmission solution 2. The square in dashed lines represents the non-periodically broadcast system information and the square in solid lines represents the periodically broadcast system information.

The base station sends the non-periodically broadcast system information and the periodically broadcast system information in the same SI message. In this scheduling method, the SI message includes indication information for indicating whether the non-periodically broadcast system information is sent. Each piece of non-periodically broadcast system information may be indicated with a bit. For example, if the bit value is 1, it indicates that the corresponding non-periodically broadcast system information is sent or not; if the bit value is 0, it indicates that the corresponding non-periodically broadcast system information is not sent. Preferably, only some (for example, the previous one or some or the last one or some) SI messages include non-periodically broadcast SI messages.

An example format for scheduling non-periodically broadcast system information is provided below:

in the periodically broadcast system information and the non-periodically broadcast system information.

Figure 3:
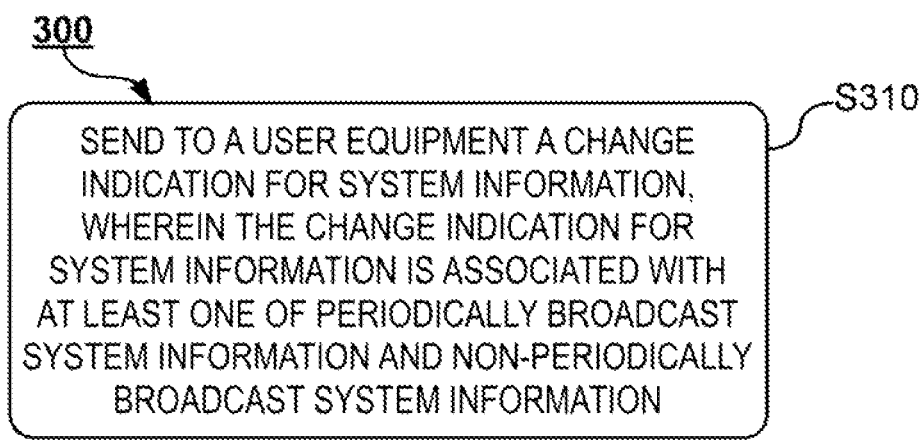
FIG. 3 is a flowchart of a method in a base station according to an embodiment of the present disclosure.

FIG. 3 is a flowchart of a method 300 in a base station according to an embodiment of the present disclosure. As shown, the method 300 includes: at step S310, sending to a user equipment a change indication for system information, wherein the change indication for system information is associated with at least one of periodically broadcast system information and non-periodically broadcast system information.

Specifically, the change indication for system information includes, but is not limited to, the following implementations in the embodiments.

Embodiment 1

According to this example embodiment, the change indication for system information comprises a first change indication for the periodically broadcast system information and/or a second change indication for the non-periodically broadcast system information.

Optionally, the change indication for system information further comprises an additional change indication, and the

```
-- ASN1START
PerdiodicallyBroadcastSystemInformationBlockTypeX ::=      SEQUENCE {
    ......
    schedulingInfoList          SchedulingInfoList,
    si-WindowLength             ENUMERATED {
                                    ms1, ms2, ms5, ms10, ms15, ms20,
                                    ms40},
    systemInfoValueTag          INTEGER (0..31),
    broadcastIndication         BIT STRING(X), OPTIONAL
    nonCriticalExtension        SystemInformationBlockType1-v890-IEs   OPTIONAL
}
SchedulingInfoList ::= SEQUENCE (SIZE (1..maxSI-Message)) OF SchedulingInfo
SchedulingInfoList ::= SEQUENCE (SIZE (1..maxSI-Message)) OF SchedulingInfo
SchedulingInfo ::= SEQUENCE {
    si-Periodicity              ENUMERATED {
                                    rf8, rf16, rf32, rf64, rf128, rf256, rf512},
    sib-MappingInfo             SIB-MappingInfo
}
SIB-MappingInfo ::= SEQUENCE (SIZE (0..maxSIB-1)) OF SIB-Type
SIB-Type ::=                    ENUMERATED {
                                    sibTypeY1, sibTypeY2, ........ }
-- ASN1STOP
```

The present disclosure classifies system information into periodically broadcast system information and non-periodically broadcast system information. Accordingly, different indications can be used to indicate whether a change occurs additional change indication is combined with the first or the second change indication to indicate a change of the periodically broadcast system information or of the non-periodically broadcast system information.

According to the example of this embodiment, different change indications for system information respectively indicate whether a change occurs in the periodically broadcast system information and the non-periodically broadcast system information.

For example, the first change indication is defined to indicate whether a change occurs in the periodically broadcast system information (or a periodically broadcast SI message) and the second change indication is used to indicate whether a change occurs in the non-periodically broadcast system information (or a non-periodically broadcast SI message). Preferably, the first change indication and the second change indication are included in the periodically broadcast system information.

It should be noted that even if a change occurs in some periodically broadcast system information and/or non-periodically broadcast system information, the corresponding change indications for system information may remain the same. For example, the change indication for system information does not indicate a change in the system information corresponding to the EWTS or CMAS, or the change indication for system information does not indicate a change in the system information sent in a predefined period. Unless otherwise specified, the change indication for system information described in the present invention only indicates whether the related system information is changed. Accordingly, the base station changes the corresponding change indication for system information only when the corresponding system information is changed. When the UE receives the change indication for system information, if the change indication for system information is different from the locally stored value, the corresponding locally stored system information is considered invalid.

An exemplary format for indicating whether a change occurs in the non-periodically broadcast system information and the non-periodically broadcast system information is provided below:

If the first change indication carried in the periodically broadcast system information is different from the locally stored value, the UE determines that the locally stored periodically broadcast system information (or the periodically broadcast SI message) is invalid, and acquires the changed periodically broadcast system information from a corresponding SI window. If the second change indication carried in the periodically broadcast system information is different from the locally stored value, the UE determines that the locally stored non-periodically broadcast system information (or the non-periodically broadcast SI message) is invalid. If the scheduling information indicates that the non-periodic system information that the UE wishes to acquire is to be sent, the changed system information is acquired from a corresponding SI window; if the non-periodic system information is not sent, the UE sends a system information request message to the base station so as to acquire the system information of interest.

Optionally, an additional change indication may also be defined. Preferably, the additional change indication is included in the periodically broadcast system information. When a change occurs in the periodically broadcast system information (or the periodically broadcast SI message), the additional change indication and the first change indication need to be updated at the same time. When a change occurs in the non-periodically broadcast system information (or the non-periodically broadcast SI message), the additional change indication and the second change indication need to be updated at the same time. If the first change indication and the additional change indication carried in the periodically broadcast system information are different from locally stored values, the UE determines that the locally stored periodically broadcast system information (or the periodically broadcast SI message) is invalid, and acquires the changed periodically broadcast system information from a corresponding SI window. If the second change indication and the additional change indication carried in the periodi-

```
-- ASN1START
PerdiodicallyBroadcastSystemInformationBlockTypeX ::=      SEQUENCE {
    ......
    schedulingInfoList              SchedulingInfoList,
    si-WindowLength                 ENUMERATED {
                                        ms1, ms2, ms5, ms10, ms15, ms20,
                                        ms40},
    broadcastSystemInfoValueTag         INTEGER (0..n),
    nonbroadcastSystemInfoValueTag      INTEGER (0..n),
    nonCriticalExtension            SystemInformationBlockType1-v890-IEs   OPTIONAL
}
SchedulingInfoList ::= SEQUENCE (SIZE (1..maxSI-Message)) OF SchedulingInfo
SchedulingInfoList ::= SEQUENCE (SIZE (1..maxSI-Message)) OF SchedulingInfo
SchedulingInfo ::= SEQUENCE {
    si-Periodicity                  ENUMERATED {
                                        rf8, rf16, rf32, rf64, rf128, rf256, rf512},
    sib-MappingInfo                 SIB-MappingInfo
}
SIB-MappingInfo ::= SEQUENCE (SIZE (0..maxSIB-1)) OF SIB-Type
SIB-Type ::=                        ENUMERATED {
                                        sibTypeY1, sibTypeY2, ........ }
-- ASN1STOP
```

A UE (for example, when the UE transitions to an in-coverage condition from an out-of-coverage condition or after a system information change period) may determine whether the stored periodically broadcast system information is still valid through the first change indication, and determine whether the stored non-periodically broadcast system information is still valid through the second change indication.

cally broadcast system information are different from locally stored values, the UE determines that the locally stored non-periodically broadcast system information (or the non-periodically broadcast SI message) is invalid. The changed non-periodically broadcast system information is then acquired again.

It should be noted that the process of UE acquiring the corresponding periodically broadcast system information or the non-periodically broadcast system information when the locally stored periodically broadcast system information or the non-periodically broadcast system information is invalid described in this embodiment is also applicable to other embodiments of the present invention.

Embodiment 2

According to this example embodiment, the change indication for system information comprises a system information message change indication associated with each system information message, wherein each system information message comprises only the periodically broadcast system information or only the non-periodically broadcast system information.

Optionally, the change indication for system information further comprises an additional change indication, wherein the additional change indication is combined with the system information message change indication to indicate a change of system information in the system information message.

According to this example embodiment, an SI message change indication is defined for each SI message.

For example, an SI message change indication is defined for each SI message. Preferably, the SI message change indication is included in the periodically broadcast system information. When an SI message is changed, the value of the corresponding SI message change indication is modified.

The UE determines whether a change occurs in the SI message by determining whether the SI message change indication corresponding to each SI message is the same as the locally stored value. If an SI message change indication is different from the locally stored value, the UE determines that the SI message is changed. If the SI message is a periodically broadcast SI message, the UE acquires changed SI message from a corresponding system information window; if the SI message is a non-periodically broadcast SI message, the UE may send a system information acquiring request to acquire the changed system information.

Optionally, an additional change indication may also be defined. Preferably, the additional change indication is included in the periodically broadcast system information. When an SI message is changed, a value of a corresponding SI message change indication and a value of an additional change indication are modified at the same time.

At this point, the UE determines whether a change occurs in the SI message by determining whether the SI message change indication and the additional change indication corresponding to each SI message are the same as the locally stored value. If an SI message change indication and the additional change indication are different from the locally stored value, the UE determines that the SI message is changed. If an SI message does not have a corresponding SI message change indication and the additional change indication is different from the locally stored value, the UE determines that the SI message is changed. If the SI message is a periodically broadcast SI message, the UE acquires changed SI message from a corresponding system information window; if the SI message is a non-periodically broadcast SI message, the UE may send a system information acquiring request to acquire the changed system information.

Embodiment 3

According to this example embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

Preferably, the change indication for system information further comprises an additional change indication, and the additional change indication is combined with the first or the second system information message change indication to indicate a change of the periodically broadcast system information or of the non-periodically broadcast system information in the system information message.

According to this example embodiment, a first SI message change indication for the periodically broadcast system information and a second SI message change indication for the non-periodically broadcast system information are defined for each SI message.

For example, if an SI message includes both the periodically broadcast system information and the non-periodically broadcast system information, the periodically broadcast first SI message change indication is defined for the SI message to indicate whether a change occurs in the periodically broadcast system information included in the SI message; and the non-periodically broadcast second SI message change indication is defined to indicate whether a change occurs in the non-periodically broadcast system information included in the SI message. Preferably, the first SI message change indication and the second SI message change indication are included in the periodically broadcast system information. When a change occurs in the periodically broadcast system information included in the SI message, the value of the first SI message change indication is modified; when a change occurs in the non-periodically broadcast system information included in the SI message, the value of the corresponding second SI message change indication is modified.

The UE determines whether a change occurs in the periodically broadcast system information included in the SI message by examining whether the first SI message change indication corresponding to each SI message is the same as the locally stored value. If the first SI message change indication is different from the locally stored value, the UE determines that a change occurs in the periodically broadcast system information included in the SI message is changed. The UE acquires the changed periodically broadcast system information from a corresponding system information window.

The UE determines whether a change occurs in the non-periodically broadcast system information included in the SI message by examining whether the second SI message change indication corresponding to each SI message is the same as the locally stored value. If the second SI message change indication is different from the locally stored value, the UE determines that the non-periodically broadcast system information included in the SI message is changed. The UE may send a system information acquiring request to acquire the changed non-periodically broadcast system information.

Optionally, an additional change indication may also be defined. Preferably, the additional change indication is included in the periodically broadcast system information. When a change occurs in the periodically broadcast system information included in the SI message, the value of the first SI message change indication and a value of the additional change indication are modified at the same time. When a change occurs in the non-periodically broadcast system information included in the SI message, the value of the corresponding second SI message change indication and a value of the additional change indication are modified at the same time.

At this point, the UE determines whether a change occurs in the periodically broadcast system information included in the SI message by examining whether the first SI message change indication corresponding to each SI message and the additional change indication are the same as the locally stored value. If the first SI message change indication corresponding to an SI message and the additional change indication are different from the locally stored value, the UE determines that a change occurs in the periodically broadcast system information in the SI message. If an SI message does not have a corresponding first SI message change indication and the additional change indication is different from the locally stored value, the UE also determines that a change occurs in the periodically broadcast system information in the SI message. The UE acquires the changed periodically broadcast system information from a corresponding system information window.

The UE determines whether a change occurs in the non-periodically broadcast system information included in the SI message by examining whether the second SI message change indication corresponding to each SI message and the additional change indication are the same as the locally stored value. If the second SI message change indication corresponding to an SI message and the additional change indication are different from the locally stored value, the UE determines that a change occurs in the non-periodically broadcast system information in the SI message. If an SI message does not have a corresponding second SI message change indication and the additional change indication is different from the locally stored value, the UE also determines that a change occurs in the non-periodically broadcast system information in the SI message. The UE may send a system information acquiring request message to acquire the changed non-periodically broadcast system information.

Embodiment 4

According to this example embodiment, the change indication for system information comprises a system information message change indication associated with each system information message and a system information block change indication for a non-periodically broadcast system information block.

In an example, the system information message change indication indicates a change of the periodically broadcast system information in the system information message, and the system information message change indication is combined with the system information block change indication to indicate a change of the non-periodically broadcast system information block in the system information message.

Optionally, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In another example, the system information message change indication indicates a change of the periodically broadcast system information in the system information message; and the system information block change indication indicates a change of the non-periodically broadcast system information block in the system information message.

Optionally, the change indication for system information further comprises an additional change indication; the additional change indication is combined with the system information message change indication to indicate a change of the periodically broadcast system information in the system information message; and the additional change indication is combined with the system information block change indication to indicate a change of the non-periodically broadcast system information block in the system information message.

According to this example embodiment, an SI message change indication is defined for each SI message, and non-periodically broadcast change indication for system information is defined for each non-periodically broadcast system information block.

For example, an SI message change indication is defined for each SI message, and non-periodically broadcast change indication for system information is defined for each non-periodically broadcast system information block. Preferably, the SI message change indication and the non-periodically broadcast system information block change indication are included in the periodically broadcast system information.

The SI message change indication may mean one of the following: the SI message change indication may be used to indicate whether a change occurs in the SI message or whether a change occurs in the periodically broadcast system information included in the corresponding SI message. When the SI message change indication is used to indicate whether a change occurs in the SI message, the value of the SI message change indication needs to be modified when a change occurs in the periodically broadcast system information or the non-periodically broadcast system information included in the SI message.

When the SI message change indication is used to indicate whether a change occurs in the periodically broadcast system information included in the corresponding SI message, the value of the SI message change indication is only modified when a change occurs in the periodically broadcast system information included in the SI message.

The non-periodically broadcast system information block change indication is used to indicate whether a change occurs in the corresponding non-periodically broadcast system information block. When a change occurs in the non-periodically broadcast system information block, the value of the corresponding non-periodically broadcast system information block change indication is modified.

When the SI message change indication is used to indicate whether a change occurs in the SI message, the UE determines whether a change occurs in a non-periodically broadcast system information block included in the SI message by examining whether the SI message change indication corresponding to each SI message and the corresponding non-periodically broadcast system information block change indication are the same as the locally stored value. If the corresponding SI message change indication and the non-periodically broadcast system information block change indication are different from the locally stored value, the UE determines that a change occurs in the corresponding non-periodically broadcast system information block. The UE may send a system information acquiring request to acquire the changed non-periodically broadcast system information. If a non-periodically broadcast system information block does not have an associated non-periodically broadcast system information block change indication, the UE determines whether the non-periodically broadcast system information block is updated by examining a corresponding SI message change indication.

When the SI message change indication is used to indicate whether a change occurs in the periodically broadcast system information included in the corresponding SI message, the UE determines whether a change occurs in a non-periodically broadcast system information block included in the SI message by examining whether the non-periodically broadcast system information block change indication is the same as the locally stored value. If the corresponding non-periodically broadcast system information block change indication is different from the locally stored value, the UE determines that a change occurs in the corresponding non-periodically broadcast system information block. The UE may send a system information acquiring request to acquire the changed non-periodically broadcast system information.

The UE determines whether the periodically broadcast system information included in the SI message is valid by examining whether the second SI message change indication is the same as the locally stored value. If the SI message change indication is different from the locally stored value, the UE determines that the periodically broadcast system information included in the SI message is invalid. The UE acquires the changed periodically broadcast system information from a corresponding system information window.

Optionally, an additional change indication may also be defined. Preferably, the additional change indication is included in the periodically broadcast system information. When a change occurs in the periodically broadcast system information included in the SI message, the value of the corresponding SI message change indication and a value of the additional change indication are modified at the same time. When the SI message change indication is used to indicate whether a change occurs in the SI message and if a change occurs in the non-periodically broadcast system information block included in an SI message, a value of a corresponding non-periodically broadcast system information block change indication, a value of an SI message change indication, and a value of an additional change indication are modified at the same time. At this point, the UE determines whether a non-periodically broadcast system information block is valid by determining whether the value of the non-periodically broadcast system information block change indication, the value of the SI message change indication, and the value of the additional change indication are the same as the locally stored value. If not, the UE may send a system information acquiring request message to acquire the corresponding system information. When the SI message change indication is used to indicate whether a change occurs in the periodically broadcast system information included in a corresponding SI message and if a change occurs in a non-periodically broadcast system information block included in a SI message, a value of the corresponding non-periodically broadcast system information block change indication and a value of an additional change indication need to be modified. At this point, the UE determines whether a non-periodically broadcast system information block is valid by determining whether the value of the non-periodically broadcast system information block change indication and the value of the additional change indication are the same as the locally stored value. If not, the UE may send a system information acquiring request message to acquire the corresponding system information.

The UE determines whether a change occurs in the periodically broadcast system information included in the SI message by examining whether the SI message change indication and the additional change indication are the same as the locally stored value. If the SI message change indication corresponding to an SI message and the additional change indication are different from the locally stored value, the UE determines that a change occurs in the periodically broadcast system information in the SI message. The UE acquires the changed periodically broadcast system information from a corresponding system information window.

Embodiment 5

According to this example embodiment, the change indication for system information comprises a system information block change indication associated with each system information block.

Optionally, the change indication for system information further comprises an additional change indication, wherein the additional change indication is combined with the system information block change indication to indicate a change of system information in the system information block.

According to this example embodiment, a system information block change indication is defined for each system information block.

For example, a system information block change indication is defined for each system information block to indicate whether a change occurs in the corresponding system information block. Preferably, the system information block change indication is included in the periodically broadcast system information.

The UE determines whether a change occurs in the corresponding system information block by examining whether the system information block change indication corresponding to each system information block is the same as the locally stored value. When the system information change indication of a periodically broadcast system information block is different from the locally stored value, the UE determines that the locally stored periodically broadcast system information block is invalid. The UE may receive the changed periodically broadcast system information block from a corresponding system information window. When the system information change indication of a non-periodically broadcast system information block is different from the locally stored value, the UE determines that the locally stored non-periodically broadcast system information block is invalid. The UE may send a system information acquiring request to acquire the changed non-periodically broadcast system information block.

Optionally, an additional change indication may also be defined. Preferably, the additional change indication is included in the periodically broadcast system information. When a change occurs in a periodically broadcast system information block, a value of the corresponding periodically broadcast system information block change indication and a value of the additional change indication are modified. When a change occurs in a non-periodically broadcast system information block, a value of the corresponding periodically broadcast system information block change indication and a value of the additional change indication are modified.

The UE determines whether a change occurs in the system information block by examining whether the system information block change indication and the additional change indication are the same as the locally stored value. If a value of a system information block change indication corresponding to a periodically broadcast system information block and the additional change indication are different from the locally stored value, the UE determines that a change occurs in the periodically broadcast system information block. The UE may acquire a changed periodically broadcast system information block from a corresponding system information window. If a value of a system information block change indication corresponding to a non-periodically broadcast system information block and the additional change indication are different from the locally stored value, the UE determines that a change occurs in the non-periodically broadcast system information block. The UE may send a system information acquiring request to acquire the changed non-periodically broadcast system information.

In the above example, the periodically broadcast system information is system information periodically broadcast by a base station, and the non-periodically broadcast system information is system information sent by the base station according to a request of a UE or in response to a system information update.

In the above example, the change indication for system information is comprised in the periodically broadcast system information.

In the above example, an indication may be sent in a system information change notification message. However, an indication type included in the periodically broadcast system information may be different from the indication type included in the system information change notification message. For example, the indication type included in the periodically broadcast system information is an integer, whereas the indication type included in the system information change notification message and the second change indication for system information is Boolean.

When a change occurs in system information, a system information change notification message is sent from the base station; and a corresponding change indication is carried in the message (see the above example for the meaning of the indication; but the type may be different). The UE determines whether a change occurs in the corresponding system information through receiving the change indication carried in the system information change notification message.

The Embodiment 1 below is used as an example to illustrate how the UE determines whether a change occurs in the system information through receiving the system information change notification message. If a first change indication for system information carried in the system information change notification message indicates that a change is about to take place in the periodically broadcast system information, the UE determines that the locally stored periodically broadcast system information is invalid and begins to acquire changed periodically broadcast system information in a corresponding SI window during the next change period. If a second change indication for system information carried in the system information change notification message indicates that a change is about to take place in the non-periodically broadcast system information will, the UE determines that the locally stored non-periodically broadcast system information is invalid. The UE may send a system information acquiring request to acquire the changed system information.

Figure 4:
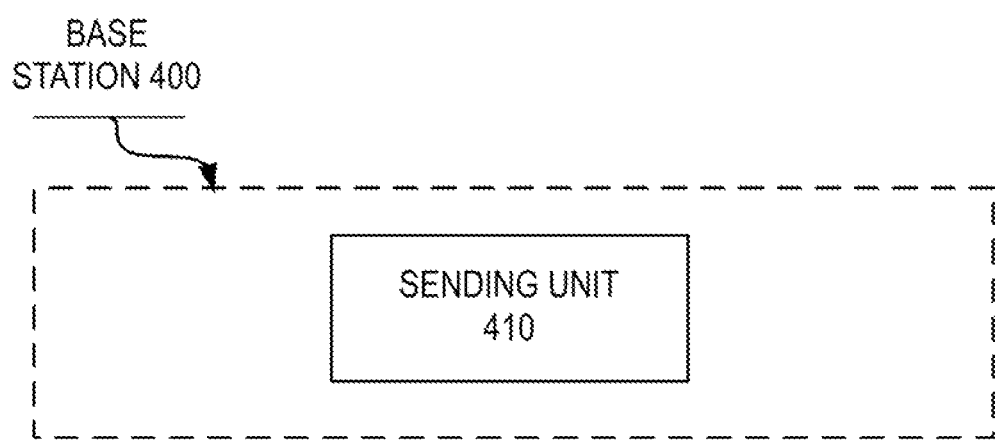
FIG. 4 is a block diagram of a base station according to an embodiment of the present disclosure.

In accordance with the method 300 described above, the present disclosure provides a base station. FIG. 4 is a block diagram of the base station 400 according to an embodiment of the present disclosure. As shown in FIG. 4, the base station 400 includes: a sending unit, configured to send to a user equipment (UE) a change indication for system information, wherein the change indication for system information is associated with at least one of periodically broadcast system information and non-periodically broadcast system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

The various embodiments described above regarding the method 300 are also applicable to the base station 400.

Figure 5:
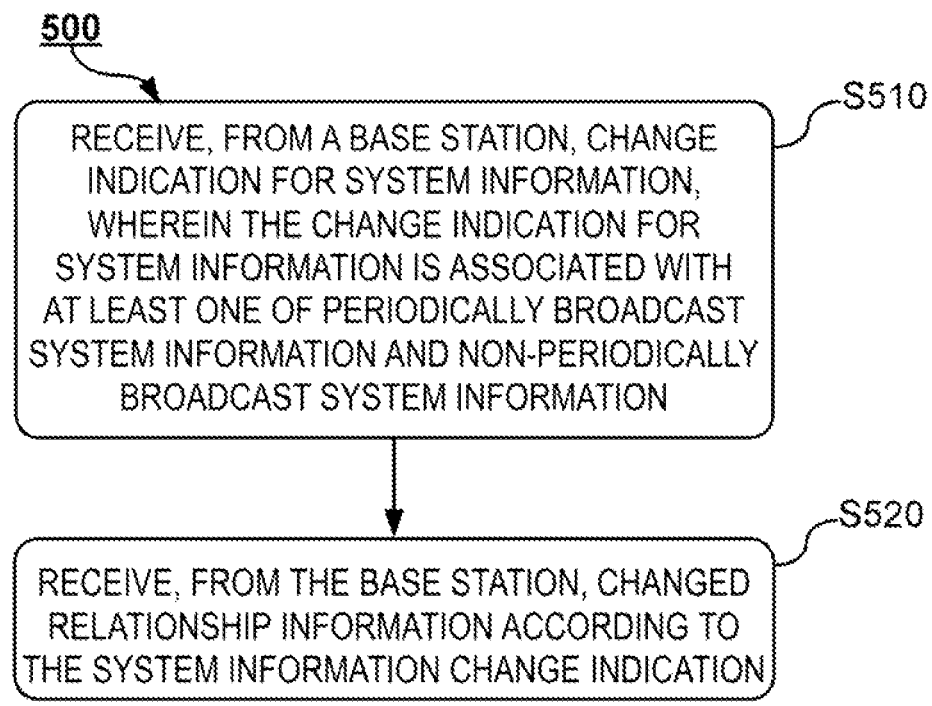
FIG. 5 is a flowchart of a method in a user equipment according to an embodiment of the present disclosure.

In accordance with the method 300 in the base station, the present disclosure provides a method 500 in a UE. As shown in FIG. 5, the method 500 comprises the following steps.

Step S510: Receive, from a base station, change indication for system information, wherein the change indication for system information is associated with at least one of periodically broadcast system information and non-periodically broadcast system information.

Step S520: Receive, from the base station, changed system information according to the system information change indication.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

In an embodiment, the receiving changed system information comprises: receiving the periodically broadcast system information at a system information window corresponding to the changed system information.

In an embodiment, the receiving changed system information comprises: sending to the base station a request for changed non-periodically broadcast system information; and receiving from the base station the changed non-periodically broadcast system information.

The various embodiments described above regarding the method 300 are also applicable to the method 500.

Figure 6:
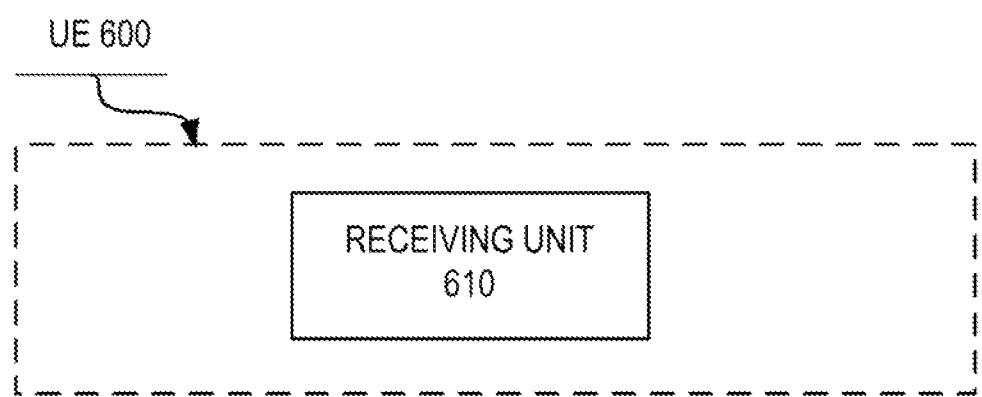
FIG. 6 is a block diagram of a user equipment according to an embodiment of the present disclosure.

In accordance with the method 500 described above, the present disclosure provides a user equipment (UE). FIG. 6 is a block diagram of a UE 600 according to an embodiment of the present disclosure. As shown, the UE 600 includes: a receiving unit 610, configured to receive, from a base station, a change indication for system information, wherein the change indication for system information is associated with at least one of periodically broadcast system information and non-periodically broadcast system information; and receive, from the base station, changed system information according to the change indication for system information.

In an embodiment, the change indication for system information comprises a first change indication for the periodically broadcast system information and/or a second change indication for the non-periodically broadcast system information.

In an embodiment, the change indication for system information further comprises an additional change indication, and the additional change indication is combined with the first or the second change indication to indicate a change of the periodically broadcast system information or of the non-periodically broadcast system information.

In an embodiment, the change indication for system information comprises a system information message change indication associated with each system information message, wherein each system information message comprises only the periodically broadcast system information or only the non-periodically broadcast system information.

In an embodiment, the change indication for system information further comprises an additional change indication, wherein the additional change indication is combined with the system information message change indication to indicate a change of system information in the system information message.

In an embodiment, the change indication for system information comprises a first system information message change indication for the periodically broadcast system information and a second system information message change indication for the non-periodically broadcast system information, both the first and second system information message change indications being associated with each system information message, and wherein each system information message comprises the periodically broadcast system information and the non-periodically broadcast system information.

In an embodiment, the change indication for system information further comprises an additional change indication, and the additional change indication is combined with the first or the second system information message change indication to indicate a change of the periodically broadcast system information or of the non-periodically broadcast system information in the system information message.

In an embodiment, the change indication for system information comprises a system information message change indication associated with each system information message and a system information block change indication for a non-periodically broadcast system information block.

In an embodiment, the system information message change indication indicates a change of the periodically broadcast system information in the system information message, and the system information message change indication is combined with the system information block change indication to indicate a change of the non-periodically broadcast system information block in the system information message.

In an embodiment, the change indication for system information further comprises an additional change indication; the additional change indication is combined with the system information message change indication to indicate a change of the periodically broadcast system information in the system information message; and the additional change indication is combined with the system information message change indication and the system information block change indication to indicate a change of the non-periodically broadcast system information block in the system information message.

In an embodiment, the change indication for system information comprises a system information block change indication associated with each system information block.

In an embodiment, the change indication for system information further comprises an additional change indication, wherein the additional change indication is combined with the system information block change indication to indicate a change of system information in the system information block.

In an embodiment, the periodically broadcast system information is system information periodically broadcast by a base station, and the non-periodically broadcast system information is system information sent by the base station according to a request of a UE or in response to a system information update.

In an embodiment, the change indication for system information is comprised in the periodically broadcast system information.

In an embodiment, a receiving unit is configured to receive the periodically broadcast system information at a system information window corresponding to the changed system information.

In an embodiment, the UE further comprises: a sending unit, configured to send to the base station a request for changed non-periodically broadcast system information, wherein the receiving unit is configured to receive, from the base station, the changed non-periodically broadcast system information.

The various embodiments described above regarding the method 300 are also applicable to the UE 600.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a recording medium for a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-piece integrated circuits). Circuits designed to execute the functions described in this description may include general purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of advances in semiconductor technology, one or more embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A method performed by a user equipment (UE) comprising:
  receiving a change indication for at least one of a periodically broadcast system information block (SIB) and a non-periodically broadcast SIB from system information which is broadcast periodically;
  if the change indication is for the periodically broadcast SIB and is different from a stored value of the periodically broadcast SIB, considering a stored content of the periodically broadcast SIB as invalid;
  if the change indication is for the non-periodically broadcast SIB and is different from a stored value of the non-periodically broadcast SIB, considering a stored content of the non-periodically broadcast SIB as invalid;
  if the stored content of the non-periodically broadcast SIB is invalid, acquiring the non-periodically broadcast SIB by sending a system information acquisition request; and
  if the stored content of the periodically broadcast SIB is invalid, acquiring the periodically broadcast SIB from a corresponding system information window (SI-window).

2. A user equipment (UE) comprising:
  receiving circuitry configured to receive a change indication for at least one of a periodically broadcast system information block (SIB) and a non-periodically broadcast SIB from system information which is broadcast periodically; and
  processing circuitry configured to:
  consider a stored content of the periodically broadcast SIB as invalid if the change indication is for the periodically broadcast SIB and is different from a stored value of the periodically broadcast SIB,
  consider a stored content of the non-periodically broadcast SIB as invalid if the change indication is for the non-periodically broadcast SIB and is different from a stored value of the non-periodically broadcast SIB,
  acquire the non-periodically broadcast SIB by sending a system information acquisition request if the stored content of the non-periodically broadcast SIB is invalid, and
  acquire the periodically broadcast SIB from a corresponding system information window (SI-window) if the stored content of the periodically broadcast SIB is invalid.

* * * * *